(12) United States Patent
Shimizu

(10) Patent No.: US 8,258,731 B2
(45) Date of Patent: Sep. 4, 2012

(54) APPARATUS AND METHOD FOR STARTING MOTOR

(75) Inventor: Fumihiro Shimizu, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 343 days.

(21) Appl. No.: 12/670,252

(22) PCT Filed: Jul. 4, 2008

(86) PCT No.: PCT/JP2008/062540
§ 371 (c)(1),
(2), (4) Date: Jan. 22, 2010

(87) PCT Pub. No.: WO2009/016939
PCT Pub. Date: Feb. 5, 2009

(65) Prior Publication Data
US 2010/0188031 A1 Jul. 29, 2010

(30) Foreign Application Priority Data
Jul. 30, 2007 (JP) .................................. 2007-197696

(51) Int. Cl.
*H02P 6/20* (2006.01)
(52) U.S. Cl. ......... 318/400.09; 318/400.11; 318/400.12; 318/400.42
(58) Field of Classification Search ............. 318/400.11, 318/400.14, 400.17, 400.2, 400.32, 430, 318/431, 720–724, 400.09, 400.1, 400.12, 318/400.42
See application file for complete search history.

(56) References Cited

U.S. PATENT DOCUMENTS

| 3,894,277 | A | * | 7/1975 | Tachibana et al. | ....... 318/400.11 |
| 3,991,354 | A | * | 11/1976 | Rosa et al. | ..................... 318/800 |
| 4,459,535 | A | * | 7/1984 | Schutten et al. | .............. 318/808 |
| 4,479,077 | A | * | 10/1984 | Kemmel et al. | ................. 318/245 |
| 6,791,204 | B2 | * | 9/2004 | Sarlioqlu et al. | ................ 290/52 |
| 2002/0047351 | A1 | | 4/2002 | Araki | |

FOREIGN PATENT DOCUMENTS

| JP | 1 268482 | 10/1989 |
| JP | 9 233885 | 9/1997 |
| JP | 2001 224198 | 8/2001 |
| JP | 2001 268974 | 9/2001 |
| JP | 3586628 | 8/2004 |

* cited by examiner

*Primary Examiner* — Bentsu Ro
(74) *Attorney, Agent, or Firm* — Oblon, Spivak, McClelland, Maier & Neustadt, L.L.P.

(57) ABSTRACT

A motor starting apparatus includes a driving signal generating unit that generates an open-loop driving signal and a drive circuit that is connected to a motor. The driving signal generating unit includes a data storing unit that stores therein predetermined data, a velocity integrating unit that integrates velocity data, a phase adjusting signal generating unit that generates a phase adjusting signal, a three-phase driving signal generating unit that generates a three-phase applied voltage, and a drive circuit driving unit that generates a driving signal of the motor. The three-phase driving signal generating unit performs open-loop driving by outputting the three-phase applied voltage based on the phase adjusting signal to the drive circuit driving unit.

7 Claims, 7 Drawing Sheets

APPARATUS AND METHOD FOR STARTING MOTOR

TECHNICAL FIELD

The present invention relates to an apparatus and a method for stating a brushless motor including, for example, multiphase coils.

BACKGROUND ART

Brushless motors are widely used in various applications including household electrical appliances and office automation equipment. In a brushless motor, a unit that detects the position of the motor's rotor is provided to acquire timing of when to commutate current applied to each coil. A sensor like, for example, a hall device, is typically used as a unit for this purpose. Using such a sensor will, however, create difficulties in reducing the size and costs of the motor. Thus, an approach is available that makes it possible to detect the position of the rotor, without using any sensor, based on a back electromotive force (back EMF) generated in a coil of a motor.

However, with the approach based on the back EMF, the back EMF cannot be detected while the rotor is in a stationary state, i.e., the motor is stationary, or while the motor is accelerated from the stationary state to a predetermined rotation velocity, and thus it is not possible to acquire timing for commutating the current. To deal with this issue, another approach is available where the rotor is rotated up to a certain velocity at which a back EMF can be detected (see, for example, Japanese Patent No. 3586628 and Japanese Patent Application Laid-open No. H9-233885).

Japanese Patent No. 3586628 discloses a method of starting a motor. More specifically, in the method, a phase of current applied to a coil is commutated regardless of a rotor position, and commutation of phases is repeatedly performed until a back EMF generated is detected.

On the other hand, Japanese Patent Application Laid-open No. H9-233885 discloses another method of starting a motor. More specifically, in the method, current is temporarily applied to a certain coil when the rotor is in a stationary state, whereby the rotor is shifted to a certain position. Then, the current applied is commutated in sequence to accelerate the rotor up to a certain velocity at which a back EMF can be detected.

In the starting method disclosed in Japanese Patent No. 3586628, however, time required for starting a motor cannot be reduced because phases of current applied are repeatedly commutated from the time of a motor start-up until a back EMF is detected.

Also in the starting method disclosed in Japanese Patent Application Laid-open No. H9-233885, time required for starting a motor cannot be reduced because the rotor is shifted to a certain position and then commutation of phases of current applied is performed in sequence until a certain velocity at which a back EMF can be detected.

The present invention is directed to solve such related-art issues. An object of the present invention is to provide a motor starting apparatus and a method of starting a motor to reduce time required for starting the motor.

DISCLOSURE OF INVENTION

According to an aspect of the present invention, there is provided a motor starting apparatus including an adjusting unit that adjusts a phase of an electrical angle of an applied voltage that is applied to a coil of the motor during a starting period from a stationary state in which a rotor of the motor is stationary till a steady state in which the rotor is accelerated to a predetermined rotational velocity.

With this configuration, the motor starting apparatus according to the present invention can set a phase difference between the electrical angle (rotor equivalent) of the applied voltage and the phase of a rotor to a certain value at which the rotor can be accelerated by adjusting the phase of the electrical angle of the voltage applied to a coil during a starting period. Therefore, the motor starting apparatus according to the present invention can start a motor smoothly, and as a result, time required for starting the motor can be shortened.

Furthermore, according to another aspect of the present invention, the motor starting apparatus further includes a first generating unit that generates a velocity integration phase signal by integrating velocity profile data that contains a relationship between electrical angular velocity and time during the starting period and a second generating unit that generates a phase adjusting signal for adjusting the phase of the electrical angle based on phase adjusting time information and phase adjusting value predefined for adjusting the phase of the electrical angle and the velocity integration phase signal generated by the first generating unit, and outputs the phase adjusting signal to the adjusting unit.

With this configuration, the motor starting apparatus according to the present invention can set a phase difference between the electrical angle (rotor equivalent) of the applied voltage and the phase of the rotor to a certain value at which the rotor can be accelerated by adjusting the phase of the electrical angle of the applied voltage using the generated phase adjusting signal. Therefore, the motor starting apparatus according to the present invention can start a motor smoothly, and as a result, time required for starting the motor can be shortened.

Moreover, according to still another aspect of the present invention, the phase adjusting signal is for delaying the electrical angle of the applied voltage by predetermined angle value at a phase adjusting time indicated by the phase adjusting time information.

With this configuration, the motor starting apparatus according to the present invention can set a phase difference between the electrical angle (rotor equivalent) of the applied voltage and the phase of the rotor to a certain value at which the rotor can be accelerated by making the phase of the electrical angle of the applied voltage lag behind by a predetermined amount. Therefore, the motor starting apparatus according to the present invention can start a motor smoothly, and as a result, time required for starting the motor can be shortened.

Furthermore, according to still another aspect of the present invention, the velocity profile data includes information for adjusting electrical angular velocity of the applied voltage.

With this configuration, the motor starting apparatus according to the present invention can set a phase difference between the electrical angle (rotor equivalent) of the applied voltage and the phase of the rotor to a certain value at which the rotor can be accelerated by adjusting the electrical angle phase and the electrical angular velocity of the applied voltage during the starting period. In addition, a velocity difference between the electrical angle (rotor equivalent) of the applied voltage and the phase of the rotor thereof can be set to a certain value at which the rotor can be accelerated. Therefore, the motor starting apparatus according to the present invention can start a motor smoothly, and as a result, time required for starting the motor can be shortened.

Moreover, according to still another aspect of the present invention, a waveform of the applied voltage is sinusoidal.

With this configuration, the motor starting apparatus according to the present invention can rotate the rotor with less vibration than when the rotor is started by a rectangular waveform, by making the waveform of the voltage applied to the coil sinusoidal-shaped, which is more continuous and smoother than the rectangular waveform.

Furthermore, according to still another aspect of the present invention, there is provided a motor starting method including adjusting a phase of an electrical angle of an applied voltage that is applied to a coil of a motor during a starting period from a stationary state in which a rotor of the motor is stationary till a steady state in which the rotor is accelerated to a predetermined rotational velocity.

With this configuration, by adjusting the phase of the electrical angle of the voltage applied to the coil thereof during the starting period, a phase difference between the electrical angle (rotor equivalent) of the applied voltage and the phase of a rotor thereof can be set to a certain value at which the rotor can be accelerated. Therefore, by the motor starting method according to the present invention, the motor can be started smoothly, and as a result, time required for starting the motor can be reduced.

Moreover, according to still another aspect of the present invention, motor starting method according to the present invention further includes adjusting electrical angular velocity of the applied voltage.

With this configuration, by adjusting the electrical angle and the electrical angular velocity of the applied voltage during the starting period, a phase difference between the electrical angle (rotor equivalent) of the applied voltage and the phase of a rotor thereof can be set to a certain value at which the rotor can be accelerated. In addition, a velocity difference between the electrical angular velocity (rotor equivalent) of the applied voltage and the velocity of the rotor thereof can be set to a certain value at which the rotor can be accelerated. Therefore, by the motor starting method according to the present invention, the motor can be started smoothly, and as a result, time required for starting the motor can be reduced.

Furthermore, according to still another aspect of the present invention, a waveform of the applied voltage is sinusoidal.

With this configuration, by making the waveform of the voltage applied to the coil sinusoidal-shaped, which is more continuous and smoother than rectangular, the rotor can be rotated with less vibration than when the rotor is started based on a rectangular waveform.

The present invention can provide a motor starting apparatus and a method of starting a motor that are effective in reducing time required for starting the motor.

BRIEF DESCRIPTION OF DRAWINGS

FIG. 2A is a diagram of the velocity profile data according to the first embodiment. FIG. 2B is the velocity integration phase signal according to the first embodiment.

FIG. 4A is a diagram of the relationship between the phase difference and the velocity difference when a phase adjustment is not performed. FIG. 4B is a diagram of the relationship between the phase difference and the velocity difference when the phase adjustment is performed.

FIG. 5A is a diagram of the rotor velocity when a phase adjustment is not performed. FIG. 5B is a diagram of rotor velocity when a phase adjustment is performed.

FIG. 8A is a diagram of rotor velocity when the reference applying voltage waveform is rectangular shaped. FIG. 8B is a diagram of the rotor velocity when the reference applying voltage waveform is sinusoidal shaped.

FIG. 9A is a diagram of velocity profile data including a velocity adjusting value according to the second embodiment. FIG. 9B is a diagram of the phase adjusting signal according to the second embodiment.

FIG. 10A is a diagram of the relationship between the phase difference and the velocity difference when neither a phase adjustment nor a velocity adjustment is performed. FIG. 10B is a diagram of the relationship between the phase difference and the velocity difference when only a phase adjustment is performed.

FIG. 11A is a diagram of rotor velocity when neither a phase adjustment nor a velocity adjustment is performed. FIG. 11B is a diagram of rotor velocity when only a phase adjustment is performed.

BEST MODES FOR CARRYING OUT THE INVENTION

Exemplary embodiments of the present invention will be described below referring to accompanying drawings, by way of example of applying the motor starting apparatus of the present invention to a starting apparatus of a three-phase brushless motor. In the descriptions below, a method of starting a rotor is referred to as "open-loop start-up" by which the motor is started without detecting any rotor position. More specifically, in the "open-loop start-up", the rotor is started, from a stationary state, i.e., a state in which the rotor is stationary, by applying, to the coil terminals of the three-phase brushless motor, a voltage according to a certain waveform.

First, a configuration according to a first embodiment of the motor starting apparatus of the present invention will be described.

Figure 1:
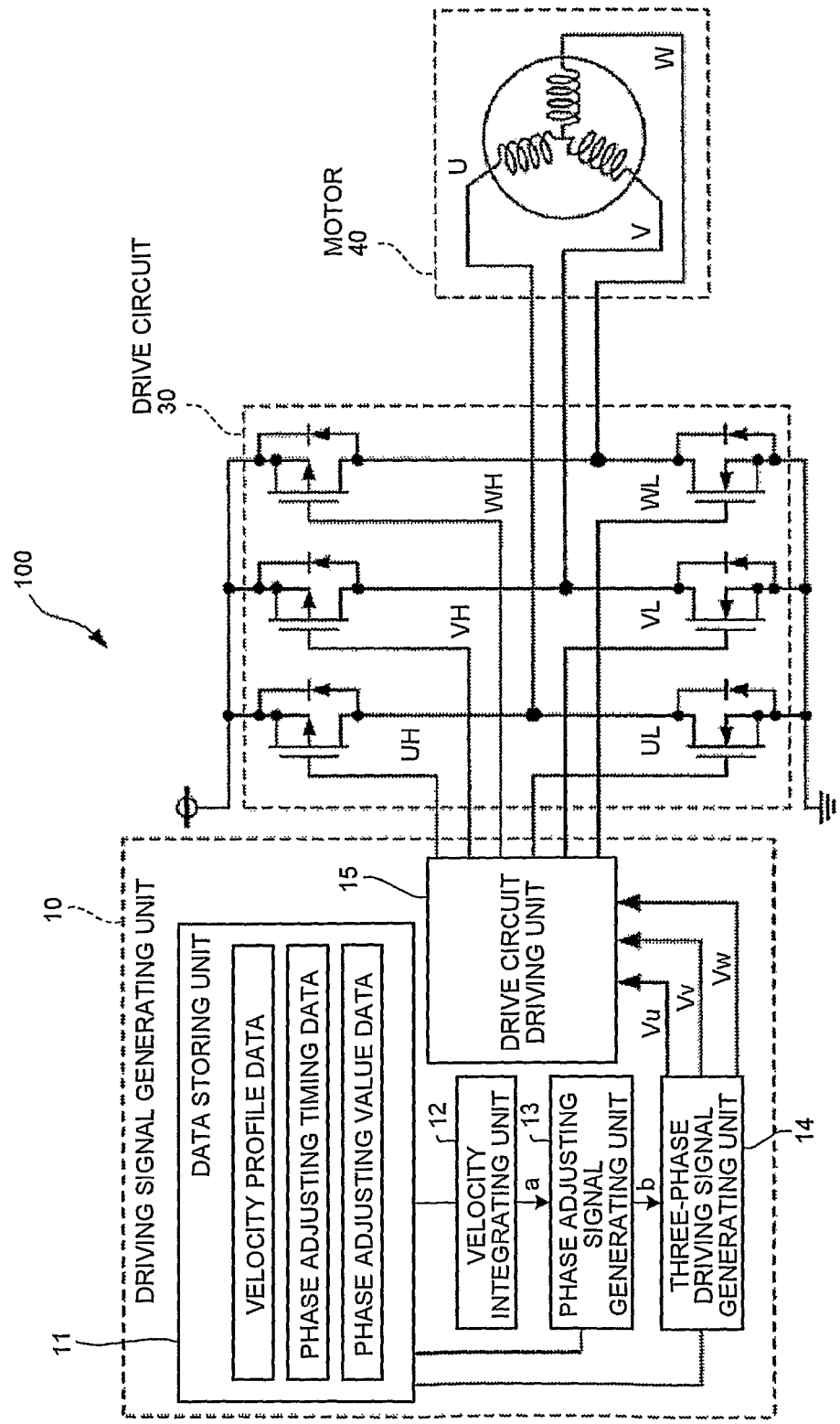
FIG. 1 is a block diagram of a configuration according to a first embodiment of a motor starting apparatus of the present invention.

As shown in FIG. 1, a motor starting apparatus 100 according to the first embodiment includes a driving signal generating unit 10 that generates an open-loop driving signal, and a drive circuit 30 connected to a three-phase brushless motor (hereinafter, simply "motor") 40.

The driving signal generating unit 10 includes a data storing unit 11 that stores certain data therein, a velocity integrating unit 12 that integrates velocity data, a phase adjusting signal generating unit 13 that generates a phase adjusting signal, a three-phase drive signal generating unit 14 that generates a three-phase drive signal, and a drive circuit driving unit 15 that drives the drive circuit 30.

The motor 40 includes coils consisting of U, V, and W phases, and a rotor (not shown) that is rotated by magnetic fields generated by each coil. Each of the coils of the motor 40 is connected to each other in a Y (star) shaped manner as shown in FIG. 1. The coils are arranged with an angle of 120 therebetween.

A predetermined voltage (hereinafter, "voltage between coil terminals") is applied to, by the drive circuit 30, between each of the coil terminals (not shown) connected to each coil. The rotor is formed of magnets such that N magnetic poles and S magnetic poles are arranged alternatively opposing the coils. A "pole pair number" below denotes how many pairs of S magnetic poles and N magnetic poles are in the rotor. When the rotor is driven according to a commutation timing detected, for example, by using a hall device, a certain relationship is presented between values pertaining to the motor starting apparatus of the present invention. More specifically, an electrical angle of a voltage between coil terminals divided by a pole pair number equals a phase of the rotor, and an electrical angular velocity of a voltage between coil terminals divided by a pole pair number equals a velocity of the rotor. On the other hand, in an open-loop start-up, the relationship is not necessarily valid. Thus in the open-loop start-up, an electrical angle divided by a pole pair number is referred to as an electrical angle (rotor equivalent), and an electrical angular velocity divided by a pole pair number is referred to as an electrical angular velocity (rotor equivalent). An electrical angular velocity can be referred to as an electrical angle frequency.

The data storing unit 11 is made of, for example, a semiconductor memory on which storage data can be electrically rewritten. The data storing unit 11 stores velocity profile data, a phase adjusting timing data, and a phase adjusting value data, therein.

First, velocity profile data denotes a relationship between an electrical angular velocity (rotor equivalent) of a voltage between coil terminals and time, during a starting period, i.e., while the rotor of the motor 40 is accelerated from its stationary state until the rotor rotates at a predetermined rotation velocity. Velocity profile data according to the present embodiment is shown in a data pattern shown in FIG. 2A.

Figure 2A:
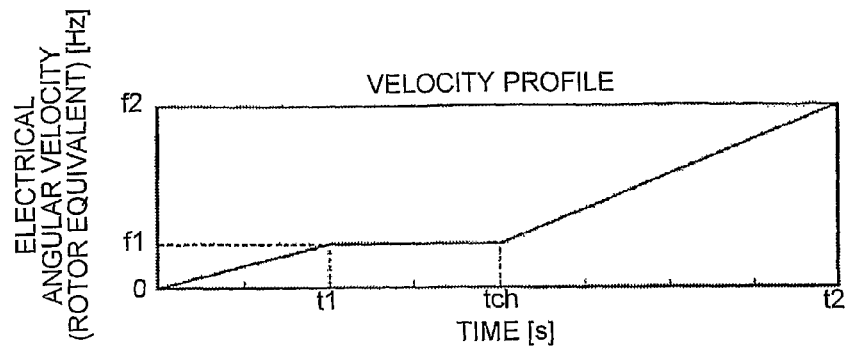
FIGS. 2A and 2B are diagrams of velocity profile data, a velocity integration phase signal, and a phase adjusting signal according to the first embodiment of the motor starting apparatus of the present invention.

In FIG. 2A, the lateral axis is a time axis, and the time 0 corresponds to when the motor 40 is started. On the other hand, the longitudinal axis shows an electrical angular velocity (rotor equivalent) of a voltage between coil terminals. FIG. 2A is an example of the velocity profile data from the time 0 to the time t2 and the electrical angle velocities (rotor equivalent) are f1 and f2 respectively at the time t1 and the time t2. During the period between the time t1 and the time tch, an electrical angular velocity (rotor equivalent) remains at f1, or the electrical angular velocity (rotor equivalent) is constant. The electrical angular velocity is maintained at a constant value, because keeping constant electrical angular velocity is favorable for stabilizing the rotor shortly after its start-up. The present invention is, however, not limited thereto.

A phase adjusting timing data denotes when to perform a phase adjustment in an electrical angle of a voltage between coil terminals during the starting period. In the present embodiment, phase adjusting timing is the time tch shown in FIG. 2A. A phase adjusting value data denotes a phase adjusting value of an electrical angle (rotor equivalent) for adjusting a phase difference between an electrical angle (rotor equivalent) of a voltage between coil terminals and a phase of the rotor during the starting period. A phase adjusting value is expressed by $d\theta$ below.

Figure 2B:
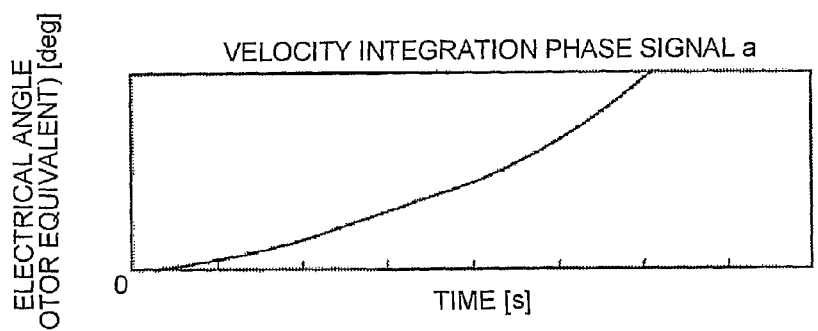

The velocity integrating unit 12 reads out velocity profile data from the data storing unit 11, generates a velocity integration phase signal "a" by integrating the read-out velocity profile data, and outputs the velocity integration phase signal "a" to the phase adjusting signal generating unit 13. More specifically, as shown in FIG. 2B, the velocity integration phase signal "a" is obtained by integrating the velocity profile data shown in FIG. 2A. The velocity integration unit 12 corresponds to the velocity integration phase signal generating unit of the present invention.

The phase adjusting signal generating unit 13 reads out the phase adjusting timing data and the phase adjusting value data from the data storing unit 11. In addition, the phase adjusting signal generating unit 13 generates a phase adjusting signal "b" based on the phase adjusting timing data and the phase adjusting value data that are read out from the data storing unit 11 and the velocity integration phase signal "a" that is generated by the velocity integrating unit 12. The phase adjusting signal generating unit 13 corresponds to the phase adjusting signal generating unit of the present invention.

Figure 2C:
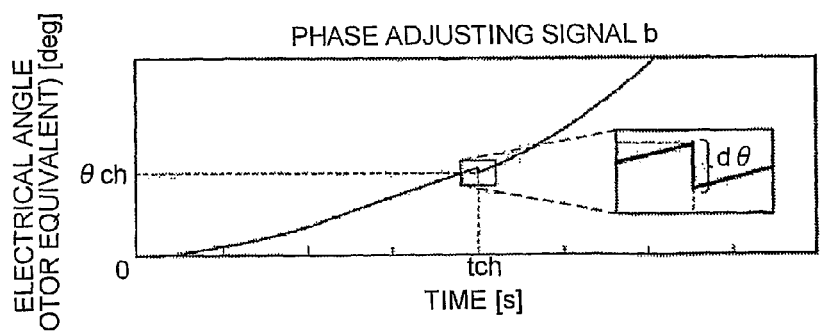
FIG. 2C is the phase adjusting signal according to the first embodiment.

More specifically, the phase adjusting signal generating unit 13, as shown in FIG. 2C, generates the phase adjusting signal "b" based on the velocity integration phase signal "a" that is input from the velocity integrating unit 12 during the period between the time 0 to the time tch, and outputs the phase adjusting signal "b" to the three-phase drive signal generating unit 14. In addition, after the time tch, the phase adjusting signal generating unit 13 generates the phase adjusting signal "b" by correcting the velocity integration phase signal "a" by using the phase adjusting value $d\theta$ that is obtained from the phase adjusting value data, and outputs the phase adjusting signal "b" to the three-phase drive signal generating unit 14. Thus, the velocity integration phase signal "a" is a signal that continuously changes along the time axis. Contrarily, the phase adjusting signal "b" is a signal where a value of an electrical angle changes steeply at the time tch.

Figure 3:
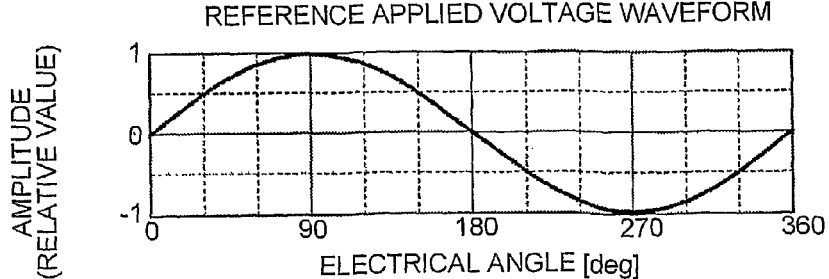
FIG. 3 is a diagram of a reference applying voltage waveform that is sinusoidal shaped, according to the first embodiment of the motor starting apparatus of the present invention.

The three-phase drive signal generating unit 14 calculates the electrical angle by multiplying the phase adjusting signal "b" by the pole pair number of the motor 40, and generates a three-phase applied voltage signal Vu by multiplying, by a predetermined applied voltage amplitude, an amplitude that is obtained from the calculated electrical angle and the reference applying voltage waveform that varies cyclically. In addition to the three-phase applied voltage signal Vu, the three-phase drive signal generating unit 14 further generates three-phase applied voltage signals Vv and Vw such that Vu, Vv, and Vw have electrical angle phase differences of 120 degrees from each other, and outputs all Vu, Vv, and Vw to the drive circuit driving unit 15. The reference applying voltage waveform is sinusoidal shaped, i.e., in a shape such that an amplitude thereof is normalized, for example, as shown in FIG. 3. The data of the reference applying voltage waveform is stored in the data storing unit 11 (not shown). The waveform that is sinusoidal shaped is not limited to the waveform shown in the FIG. 3, but also includes a waveform approximated by a sinusoidal wave by, for example, varying amplitude of a rectangular shaped waveform in a steplike manner. The three-phase drive signal generating unit 14 corresponds to an electrical angle phase adjusting unit of the present invention.

The drive circuit driving unit 15 generates switching device driving signals UH, VH, WH, UL, VL, and WL by using three-phase applied voltage signals Vu, Vv, and Vw based on a logic of, for example, a level shift system or a Pulse Width Modulation (PWM) system, and outputs the switching device driving signals UH, VH, WH, UL, VL, and WL to the drive circuit 30.

The drive circuit 30 includes an upper arm and a lower arm. More specifically, the upper arm and the lower arm, each having three switching devices and three diodes, are connected by bridges. The switching device driving signals UH, VH, and WH are input to the upper arm, and the switching device driving signals UL, VL, and WL are input to the lower arm. The drive circuit 30 drives the motor 40 by switching, based on the switching device driving signals UH, VH, WH, UL, VL, and WL.

Next, a calculation method for the phase adjusting value dθ will be described in detail. The phase adjusting value dθ is calculated by, for example, computer simulation. The calculation method will be more specifically described using parameters described below as parameters used for simulation in the open-loop start-up, by way of an example of accelerating the rotor such that the rotor rotates faster than a target velocity x hertz at the time t2 by the open-loop start-up. The target velocity x is set to 5.5 hertz. The voltage between coil terminals is set in a sinusoidal shape, and its amplitude is set to 3.15 volts (constant).

Parameters pertaining to the motor 40 are as follows.
Inertia: $9.91 \times 10^{-5}$ kg·m2
Winding resistance: 0.76 ohm
Winding inductance: $0.34 \times 10^{-3}$ Hertz
Pole pair number: 8
Interlinkage flux: 0.0047 Webers
Maximum static friction torque: $6 \times 10^{-4}$ N·m
Load torque (including dynamic friction): $5 \times 10^{-2}$ N·m.
Viscosity resistance coefficient: $4 \times 10^{-4}$ N·m·s
Times t1, tch, and t2 and frequencies f1 and f2 shown in FIG. 2A are as follows.
T1: 0.02 second
tch: 0.04 second
t2: 0.08 second
f1: 2 hertz
f2: 8 hertz First, using the above parameters, a condition will be obtained that is required for accelerating the rotor such that the rotor rotates faster than the target velocity x hertz at the time t2. In the descriptions below, a difference between the electrical angular velocity (rotor equivalent) obtained from the velocity profile data (see FIG. 2A) and the rotor velocity at the time tch is referred to as a "velocity difference" and a difference between the phase adjusting signal "b" obtained by integrating the velocity profile data (see FIG. 2C) and the phase of the rotor is referred to as a "phase difference." A minus sign of the velocity difference or the phase difference is that the rotor is lagging, and a plus sign of the velocity difference or the phase difference is that the rotor is advancing.

Figure 4A:
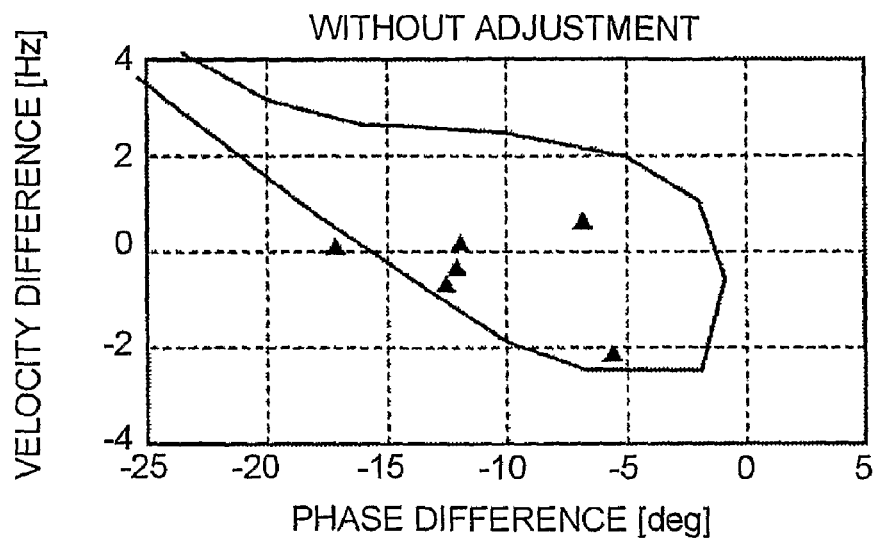
FIGS. 4A and 4B are diagrams of a relationship between a phase difference and a velocity difference obtained by simulation according to the first embodiment of the motor starting apparatus of the present invention.

In a graph where its lateral axis denotes phase differences and its longitudinal axis denotes velocity differences, as shown in FIG. 4A, a region (hereinafter, "acceleratable region") in which the rotor is accelerated to or faster than the target velocity x hertz at the time t2 can be obtained by searching the whole region in the graph for the values that allow the rotor to accelerate to or faster than the target velocity x hertz at the time t2 while changing the values of phase difference and velocity difference at the time tch by simulation. In FIG. 4A, the region surrounded by a solid line corresponds to an acceleratable region. The solid line denotes a border of the acceleratable region and is obtained by plotting acceleratable points on the graph at the time tch and encompassing the entire region filled with the plotted points.

A simulation will be described, taking the phase difference at the staring time (hereinafter, "initial phase difference") into account. As described above, the acceleratable region is a region where the rotor can accelerated such that the rotor rotates faster than the target velocity x hertz at the time t2. Thus, the motor starting apparatus 100 can smoothly start the motor 40 as long as values of the phase difference and the velocity difference are within the acceleratable region, even though variances in values of the phase difference and the velocity difference at the time tch occur due to a value of the initial phase difference.

Six data are plotted as triangular dots on FIG. 4A, which are obtained by simulation, taking the initial phase difference into account. In table 1, each of the data is shown. Table 1 also includes each data (at the far right column) of FIG. 4B, described below.

TABLE 1

| Initial phase difference [deg] | Velocity difference [Hz] | Phase difference [deg] (without phase adjustment) | Phase difference [deg] (with phase adjustment) |
| --- | --- | --- | --- |
| +22.5 | −2.06 | −5.65 | −4.35 |
| +15 | −0.66 | −12.70 | −11.40 |
| +7.5 | −0.29 | −12.14 | −10.84 |
| 0 | 0.20 | −11.99 | −10.69 |
| −7.5 | 0.64 | −6.73 | −5.43 |
| −15 | 0.10 | −17.01 | −15.71 |

The reason why a number of the plotted data is six will be described below. The pole pair number is 8 in the present embodiment, and thus the initial phase difference varies by ±22.5 degrees, where 1 cycle of an electrical angle, i.e., 360 degrees, divided by the pole pair number equals 22.5 degrees. In the present embodiment, the motor 40 is a three-phase brushless motor having coils connected to each other in a Y shaped manner, and state of the motor 40 can be divided generally into 6 parts, i.e., 7.5 degrees, where 22.5 degrees equally divided by 3 equals 7.5 degrees. Therefore, representative values of the initial phase difference are 6 in number; +22.5 degrees, +15 degrees, +7.5 degrees, 0 degree, −7.5 degrees, and −15 degrees.

Figure 4B:
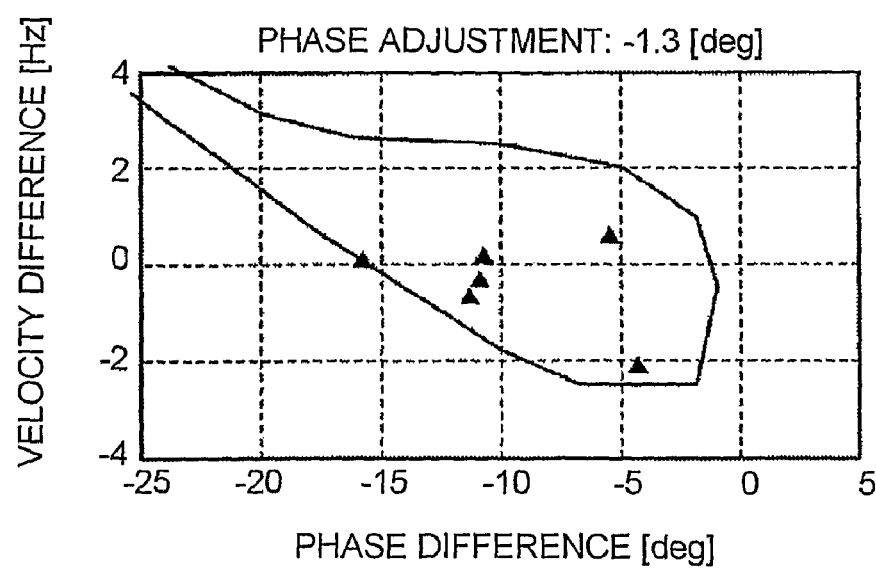

In the example of FIG. 4A and Table 1, when the initial phase difference is −15 degrees, the velocity difference is 0.1 hertz and the phase difference is −17.01 degrees and thus the point is out of the acceleratable region. To deal with the issue, as shown in FIG. 4B and the far right column of Table 1, a correction is performed according to the phase adjusting value dθ, i.e., −1.3 degrees, where the minus sign means making the phase difference closer to zero by making the electrical angle lag behind. Then, even though the velocity profile remains the same, all the points on the graph that correspond to the phase difference and the velocity difference at the time tch for all the conditions of the initial phase difference, however, are within the acceleratable region. The motor starting apparatus 100 can accelerate the rotor such that the rotor rotates faster than the target velocity x hertz at the time t2 for all the conditions of the initial phase difference.

Figure 5A:
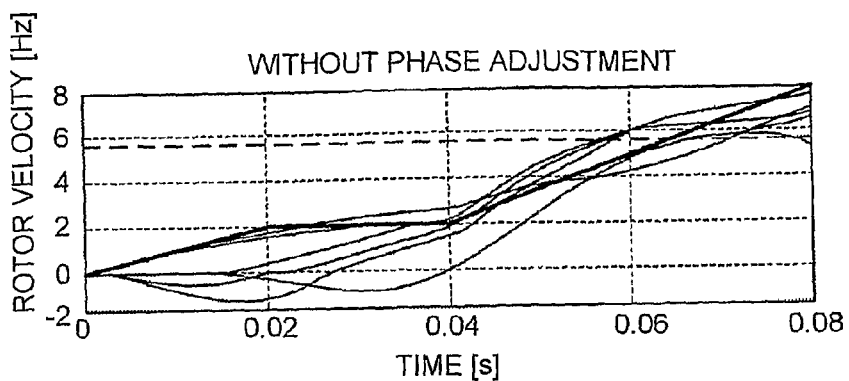
FIGS. 5A and 5B are diagrams of rotor velocity obtained by simulation according to the first embodiment of the rotor starting apparatus of the present invention.
Figure 5B:
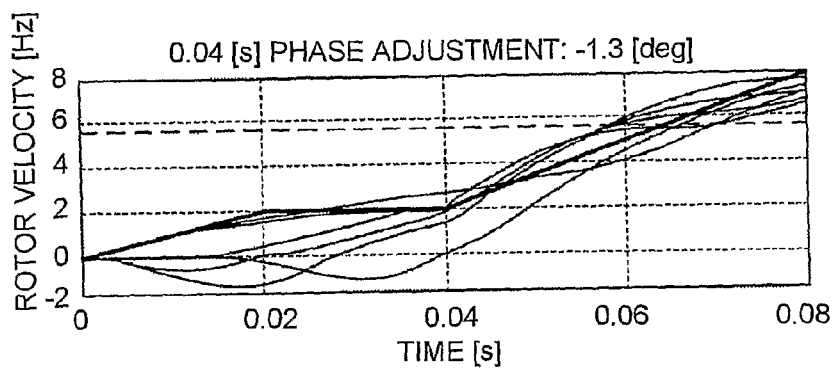

More specifically, simulation results of rotor velocity, as shown in FIGS. 5A and 5B and Table 2, are obtained. FIGS. 5A and 5B are diagrams of simulation results of rotor velocity, respectively when a phase adjustment is not performed and when a phase adjustment are performed. In FIGS. 5A and 5B, a thick solid line denotes the velocity profile, a thick dotted line denotes the target velocity x hertz, and a thin solid line denotes a simulation result of the rotor velocity for each initial phase difference. Table 2 is a table of rotor velocity at the time t2 for each initial phase difference when a phase adjustment is performed and when a phase adjustment is not performed.

TABLE 2

| Initial phase difference [deg] | Velocity [Hz] (without phase adjustment) | Velocity [Hz] (with phase adjustment) |
| --- | --- | --- |
| +22.5 | 7.82 | 7.43 |
| +15 | 7.49 | 7.12 |
| +7.5 | 6.80 | 6.79 |
| 0 | 6.56 | 6.65 |
| −7.5 | 7.03 | 7.18 |
| −15 | 5.29 | 7.70 |

As shown in FIGS. 5A and 5B and Table 2, as described above, simulation results without a phase adjustment shows that the rotor rotates slower than the target velocity x hertz at the time t2 only when the initial phase difference is −15 degrees, and simulation results with a phase adjustment shows that the rotor is accelerated such that the rotor rotates faster than the target velocity x hertz for all the initial phase differences.

Figure 6:
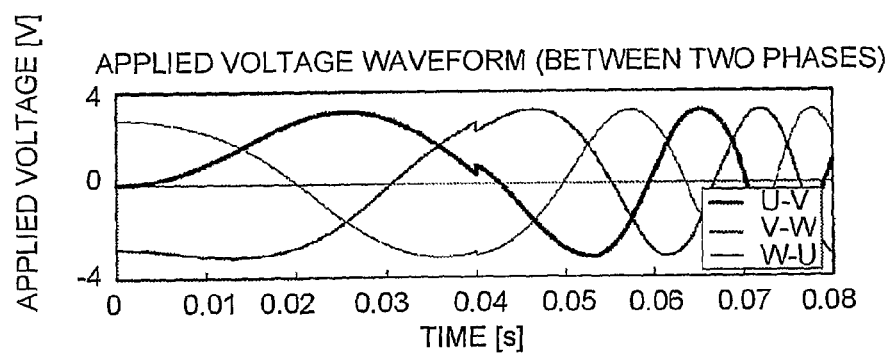
FIG. 6 is a diagram of an example of waveforms of voltage between the coil terminals when a phase adjustment is performed, according to the first embodiment of the motor starting apparatus of the present invention.

FIG. 6 is a diagram of an example of waveform of the voltage between the coil terminals of the motor 40 when the phase adjustment described above is performed. As shown in FIG. 6, the waveform of the voltage between the coil terminals is altered because the phase adjustment (dθ=−1.3 degrees) at the time tch, i.e., the time 0.04 second is performed. In FIG. 6, the voltage between the coil terminals changes over time is represented. The phase adjusting value in the waveform of the voltage between the coil terminals equals −10.4 degrees in the electrical angle of the voltage between the coil terminals by multiplying the phase adjusting value of −1.3 degrees in the electrical angle (rotor equivalent) by the pole pair numbers of 8.

The three-phase drive signal generating unit 14 is described by way of example that the reference voltage waveform is sinusoidal shaped. When the reference voltage waveform is, however, a sinusoidal shaped waveform of the voltage between the coil terminals, a similar effect can be obtained.

In addition, in descriptions above, the phase adjusting value dθ is set to be −1.3 degrees by way of example, and the phase adjusting value dθ is not limited thereto. Any value is acceptable as a phase adjusting value dθ, as long as the phase difference and the velocity difference at the time tch can be corrected to be within the acceleratable region.

Figure 7:
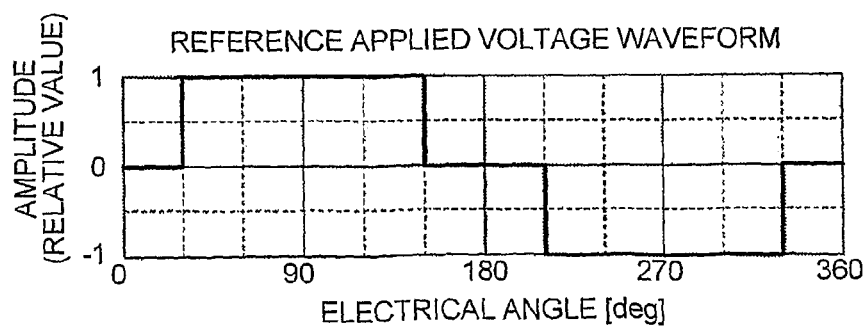
FIG. 7 is a diagram of an example of a reference applying voltage waveform when a reference applying voltage waveform is rectangular shaped, according to the first embodiment of the motor starting apparatus of the present invention.
Figure 8A:
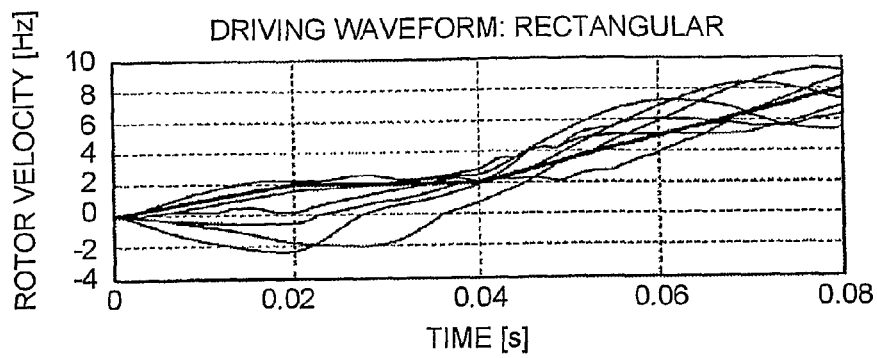
FIGS. 8A and 8B are diagrams of simulation results of rotor velocity when a reference applying voltage waveform is rectangular shaped and when a reference applying voltage waveform is sinusoidal shaped, according to the first embodiment of the motor starting apparatus of the present invention.

In the descriptions above, the reference applying voltage waveform is described as a sinusoidal shaped. On the other hand, a normalized rectangular shaped waveform can be used as a reference applying voltage waveform. For example, as in FIG. 7, the reference applying voltage waveform of when the motor 40 is driven by a 120-degree rectangular shaped waveform, can also be used. Then, a simulation result, as shown in FIG. 8A, of rotor velocity in the open-loop drive is obtained. In FIG. 8A, the amplitude of the voltage between the coil terminals is set to 4 volts. For comparison, simulation results are shown in FIG. 8B where the reference applying voltage waveform of when the motor 40 is driven by a sinusoidal wave of a voltage having an amplitude of 4 volts between the coil terminals, is used.

Figure 8B:
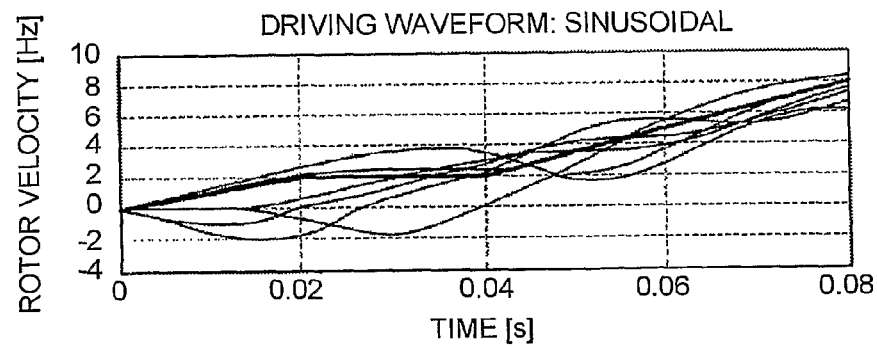

In FIGS. 8A and 8B, a thick solid line denotes a velocity profile, and a shin solid line denotes a simulation result of rotor velocity for each initial phase difference. Each of the initial phase difference is similar to when the motor 40 is driven by a sinusoidal wave, i.e., +22.5 degrees, +15 degrees, +7.5 degrees, 0 degree, −7.5 degrees, and −15 degrees. Comparing the results of when the motor 40 is driven by a rectangular wave shown in FIG. 8A with the results of when the motor 40 is driven by a sinusoidal wave shown in FIG. 8B, it is apparent that the motor 40 can be started more smoothly by the sinusoidal wave than by the rectangular wave.

Operation of the motor starting apparatus 100 according to the present embodiment will be described below.

First, the velocity integrating unit 12 reads out velocity profile data from the data storing unit 11. Next, the velocity integrating unit 12 generates the velocity integration phase signal "a" by integrating the read-out velocity profile data and outputs the velocity integration phase signal "a" to the phase adjusting signal generating unit 13.

Then, the phase adjusting signal generating unit 13 reads out the phase adjusting timing signal data and the phase adjusting value data from the data storing unit 11. In addition, the phase adjusting signal generating unit 13 generates the phase adjusting signal "b" based on the phase adjusting timing data and the phase adjusting value data that are read out from the data storing unit 11 and the velocity integration phase signal "a" generated by the velocity integrating unit 12, and outputs the phase adjusting signal "b" to the three-phase drive signal generating unit 14.

The three-phase drive signal generating unit 14 calculates the electrical angle by multiplying the phase adjusting signal "b" by the pole pair numbers of the motor 40, and generates a three-phase applied voltage signal Vu by multiplying, by a predetermined applied voltage amplitude, an amplitude obtained from the calculated electrical angle and the reference applying voltage waveform (see FIG. 3) that varies cyclically. In addition to the three-phase applied voltage signal Vu, the three-phase drive signal generating unit 14 further generates the other three-phase applied voltage signals Vv and Vw also, such that Vu, Vv, and Vw have electrical angle phase difference of 120 degrees from each other, and outputs all the three-phase applied voltage signals Vu, Vv, and Vw to the drive circuit driving unit 15.

The drive circuit driving unit 15 generates switching device driving signals UH, VH, WH, UL, VL, and WL by using three-phase applied voltage signals Vu, Vv, and Vw based on a logic of, for example, a level shift system or a PWM system, and outputs the switching device driving signals UH, VH, WH, UL, VL, and WL to the drive circuit 30.

The drive circuit 30 drives the motor 40 by switching, based on the switching device driving signals UH, VH, WH, UL, VL, and WL.

As described above, in the motor starting apparatus 100 according to the present embodiment, the phase adjusting signal generating unit 13 generates the phase adjusting signal "b" that is used for adjusting the phase of the electrical angle (rotor equivalent) of the applied voltage, and the three-phase drive signal generating unit 14 generates the three-phase applied voltage signal Vu, Vv, and Vw based on the phase adjusting signal "b". Thus a phase difference between the electrical angle of the applied voltage and the phase of the rotor can be set to a certain value in which the rotor can be accelerated, by adjusting the phase of the electrical angle of the applied voltage by using the phase adjusting signal "b". Therefore, the motor starting apparatus 100 according to the present embodiment can start the motor 40 smoothly, and reduce time required for starting the motor 40.

In the embodiment described above, it is explained that putting a minus sign of the phase adjusting vale dθ is equal to making the electrical angle phase lag behind. For example, in the motor having the pole pair number of 1, making the electrical angle phase lag behind by 1 degree means that making the electrical angle phase advance by 359 degrees. Thus making the electrical angle phase lag behind by the phase adjusting value dθ can be expresses as making the electrical angle phase advance by using the phase adjusting value dθ.

In the embodiment described above, it is explained that the velocity integrating unit 12 reads out the velocity profile data from the data storing unit 11, and generates the velocity integration phase signal "a" by integrating the speed profile data that is read out, but the present invention is not limited thereto. Similar effects can be obtained without the velocity integrating unit 12 by a configuration in which the data storing unit 11 stores therein phase signal data generated by integrating the velocity profiles and the phase adjusting signal generating unit 13, instead of receiving the velocity integration phase signal "a", reads out the phase signal data from the data storing unit 11.

In addition, in the embodiment described above, it is explained that the velocity integrating unit 12 reads out the velocity profile data from the data storing unit 11 and generates the velocity integration phase signal "a" by integrating the read-out velocity profile data, and the phase adjusting signal generating unit 13 reads out the phase adjustment timing data and the phase adjusting value data from the data storing unit 11 and generates the phase adjusting signal "b" based on the phase adjusting timing data and the phase adjusting value data that are read out and the velocity integration phase signal "a". The present invention, however, is not limited thereto. Similar effects can be obtained without the velocity integrating unit 12 and the phase adjusting signal generating unit 13 by another configuration in which the data storing unit 11 stores therein phase adjustment signal data generated by integrating the velocity profiles and including the phase adjusting value dθ and the three-phase drive signal generating unit 14, instead of receiving the phase adjusting value signal "b", reads out the phase adjustment signal data from the data storing unit 11. In the embodiment described above, it is explained that the three-phase drive signal generating unit 14 calculates the electrical angle by multiplying the phase adjusting signal "b" by the pole pair numbers of the motor 40. The present invention, however, is not limited thereto. The three-phase drive signal generating unit 14 can also be configured such that the three-phase drive signal generating unit 14 does not multiply the phase adjusting signal "b" by the pole pair numbers, but multiplies velocity profile data and phase adjusting value data by the pole pair numbers and stores the calculated value in the data storing unit 11. The motor starting apparatus 100 in the configuration obtains similar effects.

The motor starting apparatus 100 according to a second embodiment is the same as the motor starting apparatus 100 according to the first embodiment except that the velocity profile data (see, FIG. 2A) stored by the data storing unit 11 of the motor starting apparatus 100 (see, FIG. 1) according to the first embodiment is different. Therefore, configuration of the motor starting apparatus according to the present embodiment will not be described.

Figure 9A:
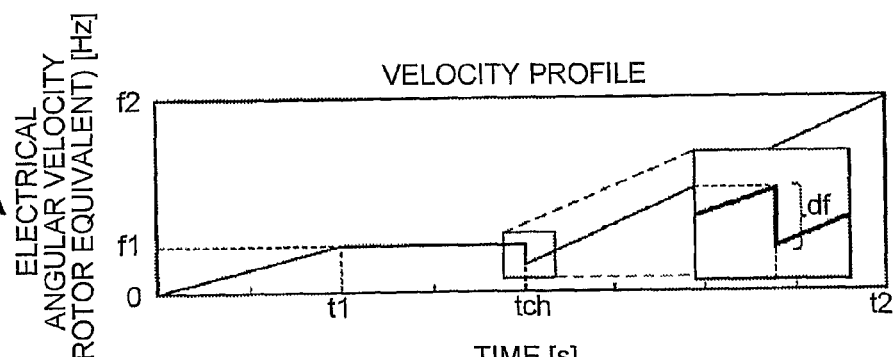
FIGS. 9A and 9B are diagrams of a velocity adjusting signal and a phase adjusting signal, according to a second embodiment of the motor starting apparatus of the present invention.

The velocity profile data according to the present embodiment, as shown in FIG. 9A, during a starting period, includes the velocity adjusting value of the electrical angular velocity (rotor equivalent) that is used for adjusting the velocity difference between the electrical angular velocity (rotor equivalent) of the voltage between the coil terminals and the velocity of the rotor. The velocity adjusting value is expressed by df below, and the electrical angular velocity is adjusted at the time tch.

Next, using parameters described below as parameters used for simulation of the open-loop start-up, an example of accelerating the rotor in the open-loop start-up such that the rotor rotates faster than the target velocity x hertz at the time t2, will be described. The parameters of the motor 40 are the same as the parameters in the first embodiment. The target velocity x is 5.5 hertz, here. The voltage between the coil terminals is sinusoidal shaped and its amplitude is 3.1 volts (constant).

Figure 9B:
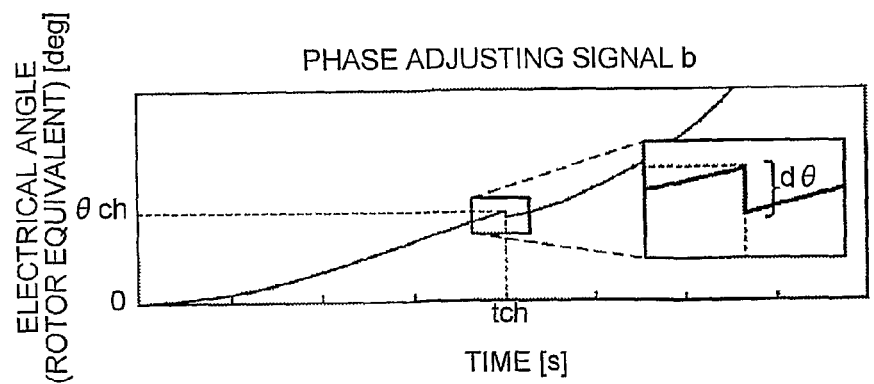

Times t1, tch, and t2 and frequencies f1 and f2 shown in FIGS. 9A and 9B are as follows.

t1: 0.02 second tch: 0.04 second t2: 0.08 second f1: 2 hertz f2: 8 hertz

Figure 10A:
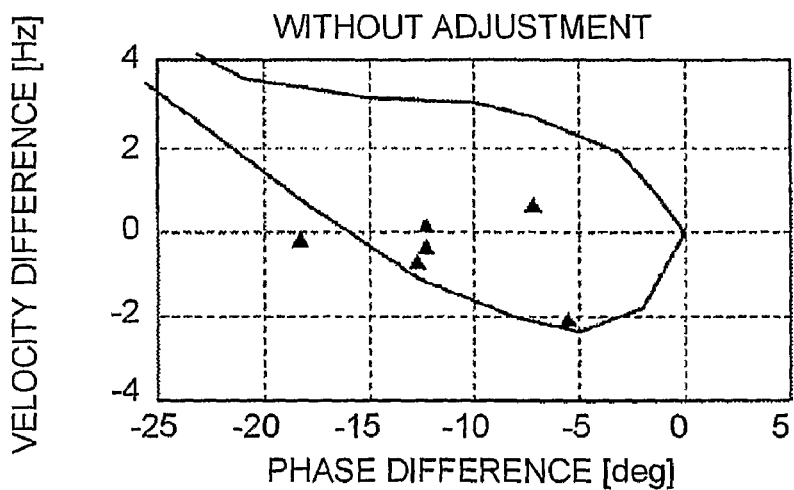
FIGS. 10A and 10B are diagrams of a relationship between a phase difference and a velocity difference obtained by simulation according to the second embodiment of the motor starting apparatus of the present invention.
Figure 10B:
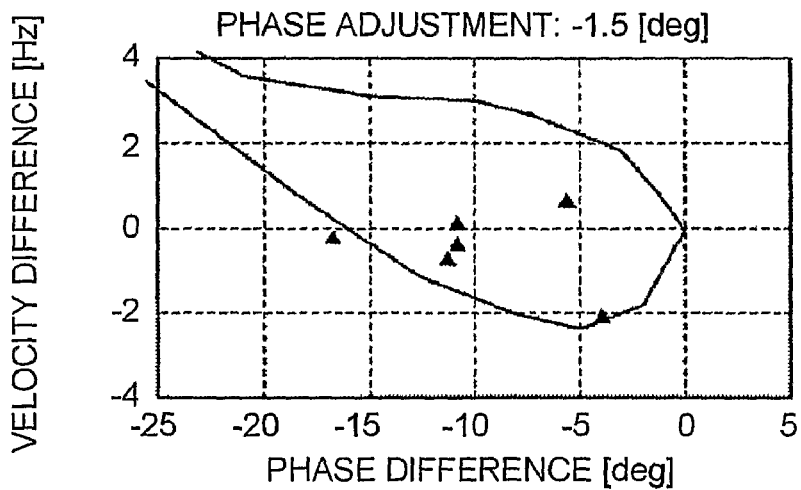
Figure 10C:
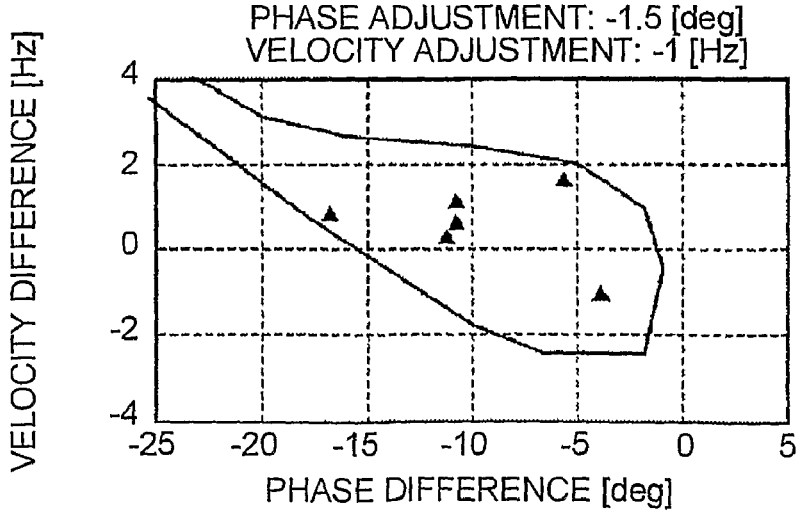
FIG. 10C is a diagram of the relationship between the phase difference and the velocity difference when both the phase adjustment and the velocity adjustment are performed.

Each of the acceleratable regions in FIGS. 10A, 10B, and 10C shows condition of a phase difference and a velocity difference at the time tch that is required for the rotor to be able to accelerate such that the rotor rotates faster than the target velocity x hertz at the time t2 as in FIG. 4, without any adjustment, with only phase adjustment, and with both of phase adjustment and velocity adjustment, respectively. Because, at the time tch, a velocity adjustment is performed, the velocity profile from the time tch to the time t2 is different from the velocity profile without any adjustment or the velocity profile with only phase adjustment. Therefore, the acceleratable regions shown in FIGS. 10A, and 10B are different from the regions shown in FIG. 10C.

In FIG. 10A, triangular dots denotes, similar to the first embodiment, data of the phase difference and the velocity difference at the time tch obtained by simulation of open-loop start-up, changing value of the initial phase difference. Data of the velocity difference and the phase difference that are plotted are down in Table 3.

TABLE 3

| Initial phase difference [deg] | Velocity difference [Hz] (without velocity adjustment) | Velocity difference [Hz] (with velocity adjustment) | Phase difference [deg] (without phase adjustment) | Phase difference [deg] (with phase adjustment) |
| --- | --- | --- | --- | --- |
| +22.5 | −2.08 | −1.08 | −5.50 | −4.00 |
| +15 | −0.71 | 0.29 | −12.67 | −11.17 |
| +7.5 | −0.35 | 0.65 | −12.28 | −10.78 |
| 0 | 0.14 | 1.14 | −12.27 | −10.77 |
| −7.5 | 0.63 | 1.63 | −7.08 | −5.58 |
| −15 | −0.21 | 0.79 | −18.33 | −16.83 |

As shown in FIG. 10A and Table 3, when the initial phase difference is −15 degrees and any adjustment is not performed, the phase difference and the velocity difference at the time tch are not included in the acceleratable region in which the rotor can be accelerated such that the rotor rotates faster than the target velocity x hertz at the time t2. As shown in FIG. 10B, even when phase adjustment only is performed according to the phase adjusting value dθ=−1.5 degrees (the direction in which the phase difference is getting closer to zero), the result is similar.

As shown in FIG. 10C, when an electrical angle adjustment and an electrical angular velocity adjustment are performed according to a phase adjusting value dθ=−1.5 degrees and a velocity adjusting value df=−1 hertz (the direction in which the velocity difference is getting closer to zero), the phase difference and the velocity difference at the time tch are included in the acceleratable region for all the initial phase differences.

Figure 11A:
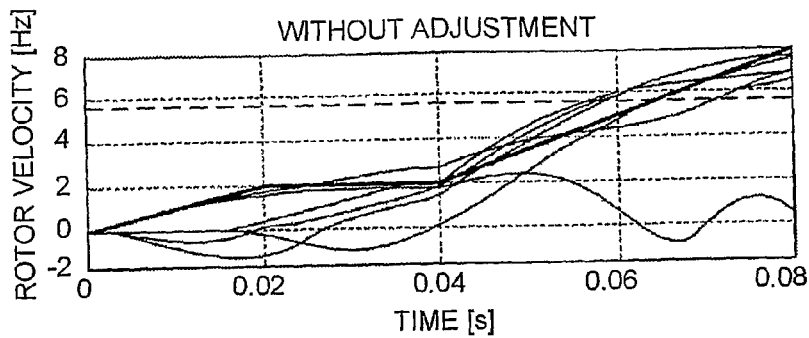
FIGS. 11A and 11B are diagrams of rotor velocity obtained by simulation according to the second embodiment of the motor starting apparatus of the present invention.
Figure 11B:
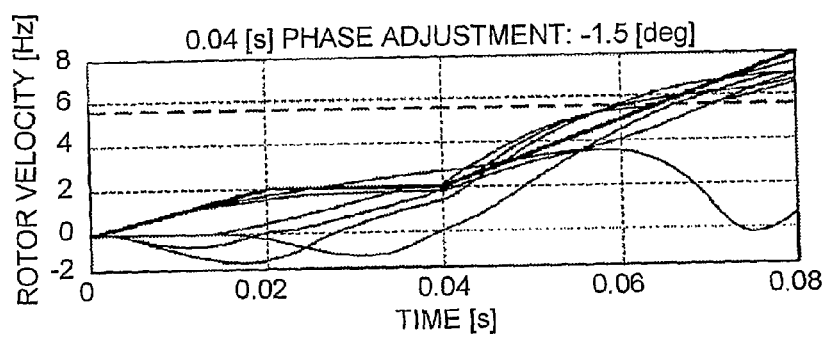
Figure 11C:
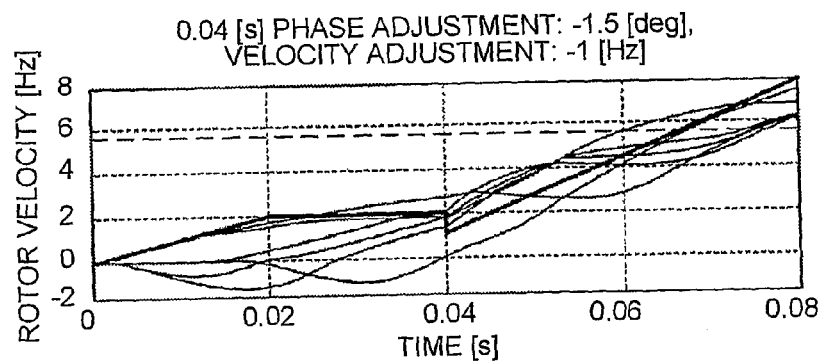
FIG. 11C is a diagram of rotor velocity when both the phase adjustment and the velocity adjustment are performed.

Next, simulation results of the rotor velocity are shown in FIGS. 11A, 11B, and 11C and Table 4. In FIGS. 11A, 11B, and 11C, simulation results are represented without any adjustment, with only phase adjustment, and with both of phase adjustment and velocity adjustment, respectively. In FIGS. 11A, 11B, and 11C, thick solid lines denote the velocity profiles, thick dotted lines denote the target velocity x hertz, and thin slid lines denote a simulation result of rotor velocity for each initial phase difference. In Table 4, velocity data of the rotor at the time t2 are presented for all the initial phase differences.

TABLE 4

| Initial phase difference [deg] | Velocity [Hz] (without phase adjustment) | Velocity [Hz] (with phase adjustment) | Velocity [Hz] (with phase adjustment and velocity adjustment) |
| --- | --- | --- | --- |
| +22.5 | 7.58 | 7.14 | 7.48 |
| +15 | 7.65 | 7.17 | 6.44 |
| +7.5 | 6.91 | 6.84 | 6.37 |
| 0 | 6.59 | 6.67 | 6.25 |
| −7.5 | 6.96 | 7.12 | 6.13 |
| −15 | 0.21 | 0.57 | 6.97 |

As in FIGS. 11A, 11B, and Table 4, when adjustment is not performed or when only phase adjustment is performed, the rotor slower than the target velocity x hertz at the time t2 in the initial phase difference of −15 degrees as described above. In addition, as in FIG. 11C and Table 4, by performing both of the phase adjustment and the velocity adjustment, the rotor can be accelerated such that the rotor rotates faster than the target velocity x hertz, for all the initial phase differences.

Figure 12:
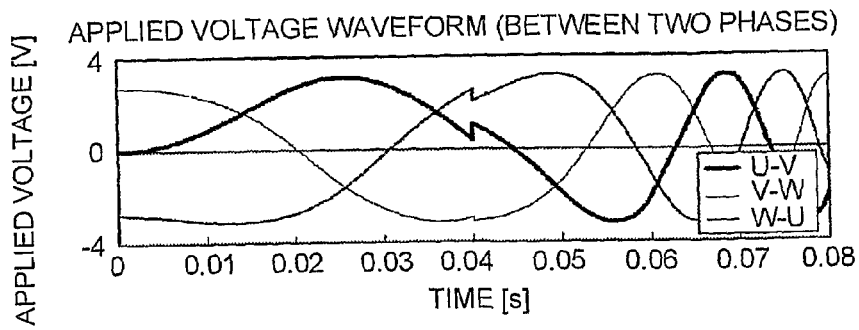
FIG. 12 is a diagram of a waveform example of the voltage between coil terminals when both the phase adjustment and the velocity adjustment are performed, according to the second embodiment of the motor starting apparatus of the present invention.

In FIG. 12, a waveform example of voltage between the coil terminals of the motor 40 is illustrated when the phase adjustment and the velocity adjustment are performed. As shown in FIG. 12, at the time 0.04 second, i.e., the time tch, phase adjustment of according to dθ=−1.5 degrees and velocity adjustment of according to df=−1 hertz are performed. Thus, the waveform of the applied voltage is changed. In FIG. 12, the voltage between the coil terminals changes over time is represented. The phase adjusting value in the waveform of the voltage between the coil terminals is −12 degrees in the electrical angle of the voltage between the coil terminals, which is calculated such that the phase adjusting value of −1.5 degrees of the electrical angle (rotor equivalent) is multiplied by the pole pair number of 8. The velocity adjusting value in the electrical angular velocity of the voltage between the coil terminals is −8 hertz, which is calculated such that the phase adjusting value of −1 hertz, is multiplied by the pole pair number of 8.

The values that the phase adjusting value dθ=−1.5 degrees and the velocity adjusting value df=−1 hertz are an example. Therefore the values are not limited thereto. Any value is acceptable, as long as the phase difference and the velocity difference at the time tch can be corrected so that the phase difference and the velocity difference at the time tch can be within the acceleratable region.

Operation of the motor starting apparatus according to the present embodiment is similar to the motor starting apparatus 100 according to the first embodiment. Thus description thereof is abbreviated.

As described above, in the motor starting apparatus according to the present embodiment, by adjusting the electrical angle and the electrical angular velocity of the applied voltage during the starting period, the phase difference between the electrical angle (rotor equivalent) of the applied voltage and the phase of the rotor thereof can be set to a certain value, at which the rotor can be accelerated. In addition, a velocity difference between the electrical angle (rotor equivalent) velocity of the applied voltage and the velocity of the rotor thereof can be set to a certain value, at which the rotor can be accelerated. Thus, in the motor starting apparatus according to the present embodiment, the motor can be started smoothly. As a result, time required for starting the motor can be reduced.

In the embodiments described above, the velocity adjustment is performed simultaneously with the phase adjustment at the time tch. The present invention, however, is not limited thereto, and it is not necessarily required that a phase adjustment and a velocity adjustment should be performed at the same time.

In the embodiments described above, it is explained that the velocity profile data preliminarily includes the velocity adjusting value df. The present invention, however, is not limited thereto. The motor starting apparatus 100 can also be configured such that the velocity profile data (see, FIG. 2A) not including the velocity adjusting value df, the timing data of when to perform the velocity adjustment, and the velocity adjusting value df are preliminarily stored therein, and a unit that generates velocity profile data including velocity adjusting value df based on these data is provided for the motor starting apparatus 100. The motor starting apparatus 100 in the configuration also has a similar effect.

INDUSTRIAL APPLICABILITY

As described above, the motor starting apparatus and the motor starting method according to the present invention are suitable for reducing time for starting a motor, and can be effectively applied for a motor starting apparatus and a motor starting method for starting a brushless motor.

The invention claimed is:

1. An apparatus for starting a motor, comprising:
an adjusting unit that adjusts a phase of an electrical angle of an applied voltage that is applied to a coil of the motor during a starting period from a stationary state in which a rotor of the motor is stationary until a steady state in which the rotor is accelerated to a predetermined rotational velocity;
a first generating unit that generates a velocity integration phase signal by integrating velocity profile data that includes a relationship between electrical angular velocity and time during the starting period; and
a second generating unit that generates a phase adjusting signal for adjusting the phase of the electrical angle based on phase adjusting time information and phase adjusting value predefined for adjusting the phase of the electrical angle and the velocity integration phase signal generated by the first generating unit, and outputs the phase adjusting signal to the adjusting unit.

2. The apparatus according to claim 1, wherein the phase adjusting signal is for delaying the electrical angle of the applied voltage by a predetermined angle value at a phase adjusting time indicated by the phase adjusting time information.

3. The apparatus according to claim 1, wherein the velocity profile data includes information for adjusting electrical angular velocity of the applied voltage.

4. The apparatus according to claim 1, wherein a waveform of the applied voltage is sinusoidal.

5. A method of starting a motor, comprising:
adjusting a phase of an electrical angle of an applied voltage that is applied to a coil of the motor during a starting period from a stationary state in which a rotor of the motor is stationary until a steady state in which the rotor is accelerated to a predetermined rotational velocity;
generating a velocity integration phase signal by integrating velocity profile data that includes a relationship between electrical angular velocity and time during the starting period; and
generating a phase adjusting signal for adjusting the phase of the electrical angle based on phase adjusting time information and phase adjusting value predefined for adjusting the phase of the electrical angle and the generated velocity integration phase signal, and outputting the phase adjusting signal.

6. The method according to claim 5, wherein the phase adjusting signal is for delaying the electrical angle of the applied voltage by a predetermined angle value at a phase adjusting time indicated by the phase adjusting time information.

7. The method according to claim 5, wherein the velocity profile data includes information for adjusting electrical angular velocity of the applied voltage.

* * * * *